United States Patent
Theimer et al.

(10) Patent No.: US 10,139,905 B2
(45) Date of Patent: Nov. 27, 2018

(54) METHOD AND DEVICE FOR INTERACTING WITH A GRAPHICAL USER INTERFACE

(71) Applicant: VOLKSWAGEN AKTIENGESELLSCHAFT, Wolfsburg (DE)

(72) Inventors: Wolfgang Theimer, Bochum (DE); Sebastian Gehrling, Essen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/832,919

(22) Filed: Dec. 6, 2017

(65) Prior Publication Data

US 2018/0157324 A1  Jun. 7, 2018

(30) Foreign Application Priority Data

Dec. 6, 2016  (DE) .......................... 10 2016 224 246

(51) Int. Cl.
*G06F 3/048* (2013.01)
*G06F 3/01* (2006.01)
*B60K 35/00* (2006.01)

(52) U.S. Cl.
CPC ............. *G06F 3/013* (2013.01); *B60K 35/00* (2013.01); *G06F 3/012* (2013.01); *B60K 2350/1024* (2013.01)

(58) Field of Classification Search
CPC ...................................................... G06F 3/048
See application file for complete search history.

(56) References Cited

U.S. PATENT DOCUMENTS

| 2008/0192027 A1* | 8/2008 | Morrison | G06F 3/043 345/177 |
| 2008/0316372 A1* | 12/2008 | Xu | G09G 3/20 348/739 |
| 2014/0300711 A1* | 10/2014 | Kroon | H04N 13/0033 348/51 |
| 2016/0286626 A1 | 9/2016 | Kano | |

FOREIGN PATENT DOCUMENTS

| CN | 105704479 A | 6/2016 |
| DE | 102014118109 A1 | 6/2015 |

OTHER PUBLICATIONS

German Office Action for application DE 10 2016 224 246.6.

* cited by examiner

*Primary Examiner* — Peiyong Weng
(74) *Attorney, Agent, or Firm* — Slayden Grubert Beard PLLC

(57) ABSTRACT

In a method for interacting with a graphical user interface, the graphical user interface is depicted with at least one image object on a display device. The viewing direction and the position of a user of the graphical user interface depicted on the display device is determined, and an image object viewed by the user that is depicted on the graphical user interface is determined from the detected viewing direction and position of the user. Moreover, the distance of the user from the viewed image object is determined from the position of the user and the position of the viewed image object on the display device. When it is determined that the distance of the user from the viewed image object has been reduced and the image object was still viewed by the user, additional information is output to the user.

12 Claims, 5 Drawing Sheets a)

b)

METHOD AND DEVICE FOR INTERACTING WITH A GRAPHICAL USER INTERFACE

CROSS-REFERENCE TO RELATED APPLICATIONS

This application claims the benefit of German Patent Application DE 10 2016 224 246.2, filed on Dec. 6, 2016 with the German Patent and Trademark Office. The contents of the aforesaid German Patent Application are incorporated herein in its entirety for all purposes.

FIELD OF THE INVENTION

The present invention relates to a method for interacting with a graphic user interface. The present invention moreover relates to a device for performing the method and a vehicle that is configured to execute such a method, or has such a device.

BACKGROUND

In many areas of technology, user interfaces (HMI short for "human machine interface") are used for interacting with machines and equipment, wherein graphical user interfaces, or respectively user interfaces (GUI short for "graphical user interface") are now widespread. Graphical user interfaces can be used to depict, select and operate complex graphical elements on a screen surface. Operation can be carried out by a plurality of different input devices, such as by touching a touch-sensitive display surface, a so-called touchscreen.

With GUIs that have an extensive scope of functions, or respectively a plurality of functionalities, the number of graphic and/or control elements can be so large that they cannot all be effectively displayed simultaneously. The danger also exists that the comprehensibility and usefulness of the GUI will suffer from displaying a plurality of graphic and/or control elements. This can for example be problematic when GUIs are used in vehicles. Consequently, with a GUI intended for the driver of a vehicle, the representation of information and operation should be as simple and intuitive as possible, in particular while driving, to minimize distraction from the task of driving and ensure driving safety.

Although the driver in most driving situations is interested in a compact representation of information, there are also cases in which he desires more comprehensive or detailed information. Normally, the driver must make control entries to switch from a representation of information to another one with more details. This can be accomplished by pressing a button, executing a gesture, or by voice commands. Alternatively, this can also occur automatically. For example, the direct environment can be enlarged in a driving maneuver in a navigation application and then minimized after the driving maneuver.

From the prior art, it is known to provide a viewing-direction-dependent display device to simplify interaction with the GUI for the driver. For example, DE 10 2013 015 634 A1 describes detecting the viewing direction of a driver of a motor vehicle in order to activate an interactive mode when the driver looks at one of several display regions of a display apparatus, at least for a given duration of a glance. In this context, the interaction mode is maintained as long as a control of the display apparatus is not terminated, or another predetermined criterion has not been satisfied.

EP 2 390 139 A1 also discloses detecting the viewing direction of the driver to determine which of several possible areas of interest he is viewing. This area is first illuminated more weakly and then more strongly while viewing over a specific period.

DE 10 2007 025 531 A1 likewise discloses a viewing-direction-controlled display system for a motor vehicle in which the viewing direction of the driver is detected and the duration of the detected viewing direction is determined, wherein information is depicted depending on the duration of the viewing direction, and possibly also depending on the urgency of perceiving the depicted information.

DE 10 2012 006 966 A1 discloses that the viewing direction of the driver is detected in order to determine a control panel on a display surface viewed by the driver, and to trigger an associated function that be can be executed by the vehicle.

Finally, DE 10 2013 210 354 A1 discloses a view-controlled interaction with images on data glasses worn by the driver of a vehicle. In this context, the viewing direction of the driver is detected, and it is determined whether the viewing direction points toward a display area with an activation element on the data glasses. If this is the case, content assigned to the activation element is depicted on a display area that is larger than the display area of the activation element.

SUMMARY

An object exists to provide a method for interacting with a graphical user interface that makes it possible to trigger a detailed representation in an intuitive manner, and in particular can be used in a motor vehicle.

This object is solved with a method having the features of the independent method claim and a corresponding device according to the independent apparatus claim. Various embodiments of the invention are described in the dependent claims and the following description.

DETAILED DESCRIPTION OF EMBODIMENTS

Figure 1:
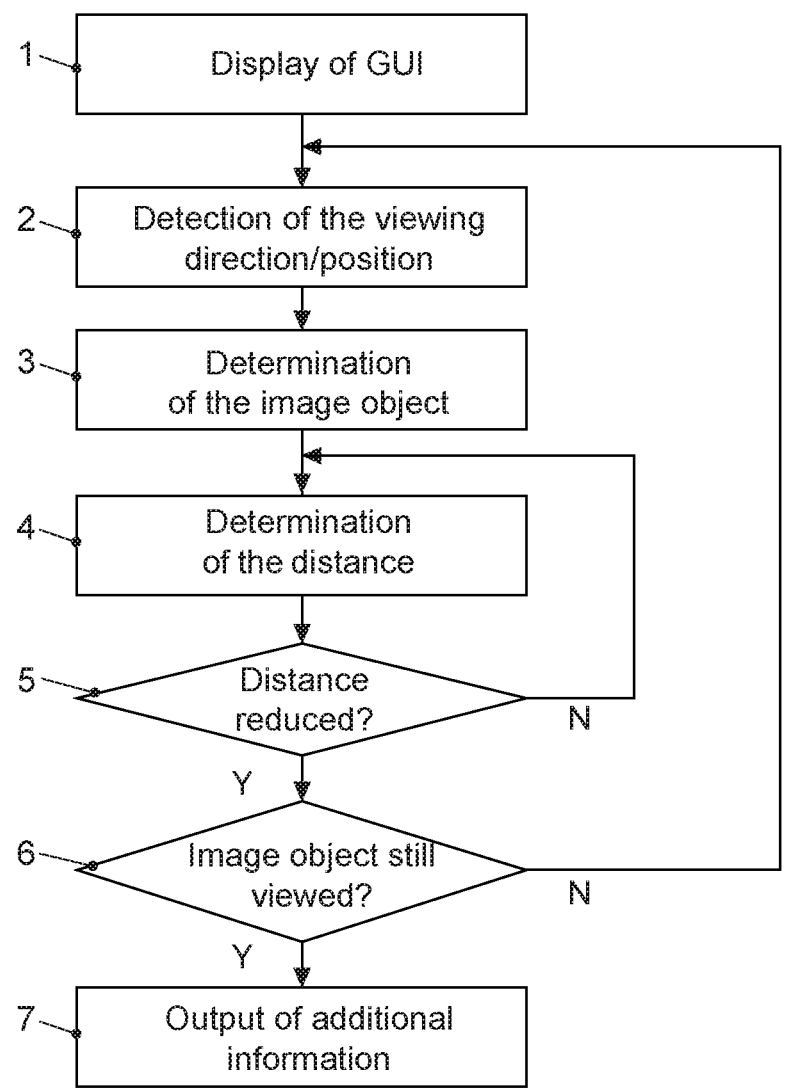
FIG. 1 schematically shows the method according to the invention for interacting with a graphical user interface.

According to a first aspect, a method for interacting with a graphical user interface comprises the following steps:
- depicting a graphical user interface with at least one image object on a display device;
- detecting the viewing direction and the position of a user of the graphical user interface depicted on the display device;
- determining an image object viewed by the user that is depicted on the graphical user interface from the detected viewing direction and position of the user;

determining the distance of the user from the viewed image object from the position of the user and the position of the viewed image object on the display device;

outputting additional information to the user when it is determined that the distance of the user from the viewed image object has been reduced and the image object was still viewed by the user.

Since the position of the user is also detected in addition to the viewing direction of the user in the invention, an approach by the user toward the display device, or respectively the image object viewed by the user can be determined. This makes it possible to easily output additional, or respectively more detailed information without using additional control elements if this is desired by the user. Since the image object, or respectively the area of the graphical user interface that is viewed and held in focus by the user is detected, additional, or respectively more detailed information can be specifically output about it. In this regard, the invention according to this aspect can be used for a plurality of image objects, or respectively areas of the graphical user interface, and is not restricted to a predefined area.

In one embodiment, the approach by the user is determined from an increase in the detected user's interpupillary distance. This is particularly easy to implement since the eyes of the user are already detected in order to determine the image object viewed by the user, and the position of the eyes therefore must also be determined.

According to another embodiment, the additional information is output when the approach by the user toward the viewed image object exceeds a threshold value. In this manner, it is possible to distinguish between slight and possibly unintentional head movements on the part of the user that should not lead to an outputting of additional, or respectively more detailed information, and an intentional approach by the user for such output, and the operating reliability of the graphical user interface is accordingly increased.

Likewise, the operating reliability can be increased by providing feedback to the user about which image object he has held in focus by continued observation. Instead or in addition, output of additional information can moreover be rendered dependent on the user confirming this by additional input.

According to another embodiment of the invention, the output additional information comprises a detailed visual representation of the viewed image object. This is particularly intuitive for the user since the user is familiar with more details becoming visible in an object viewed by him when he approaches this object.

According to another aspect, a device according to the invention for interacting with a graphical user interface comprises:

a display device on which a graphical user interface with at least one image object is displayed;

an eye tracking system for detecting the viewing direction and the position of a user of the graphical user interface depicted on the display device;

an evaluation and control unit that supplies an output signal of the eye tracking system, and that determines an image object viewed by the user from the detected viewing direction and position of the user, and the distance of the user from the viewed image object; and an output unit that is controlled by the evaluation and control unit such that additional information is output depending on an identified approach of the user toward the viewed object.

According to one embodiment, the output unit comprises an image output unit that causes the graphical user interface to be displayed on the display device, and wherein when an approach by the user toward the display device is determined, there is a detailed visual representation of the viewed image object.

According to another embodiment, the area of the user's head position that is normally assumed is illuminated by an infrared lighting means and detected with an infrared camera oriented towards this area. This is especially advantageous in an application in a motor vehicle since lighting by NIR LEDs is not annoying to the driver, and blinding can be avoided.

In corresponding further embodiments, the method according to the invention or the device according to the invention is used in a motor vehicle.

Additional features, advantages, and embodiments can be derived from the following description of the drawings as well as the claims.

To better understand the principles of the present invention, the following embodiments of the invention will be explained in greater detail with reference to the figures. Of course, the invention is not restricted or limited to these embodiments, and the described features can also be combined or modified without departing from the scope of the invention.

FIG. 1 schematically shows the inventive method for interacting with a graphical user interface as for example can be used in a motor vehicle. When used in a motor vehicle, the graphical user interface can in particular be depicted on the instrument cluster, a display in the center console, a head-up display or in any other display that is freely programmable.

According to method step 1, the graphic user interface (GUI) is first displayed on a display device. The graphical user interface in this case typically has several image objects, wherein they can also enable operation by the user in addition to depicting image content. For example, the driver of a motor vehicle can be provided with vehicle-relevant information, wherein operation of vehicle functions is possible.

In method step 2, the viewing direction at which the user views the display device and the viewing position from which the user views the display device are detected. For this, head or eye tracking methods can be used, for example, by means of which the current position of the viewer's head, or respectively eyes as well as viewing direction can be determined relative to the vehicle coordinate system.

Then in method step 3, the image objects depicted on the graphical user interface that are being viewed by the user are determined from the detected viewing direction and position of the user. Then in method step 4, the distance of the user from the viewed image object is determined. In method step 5, it is checked whether this distance has decreased from a previously determined distance of the user from the viewed image object. If this is not the case, the distance continues to be determined according to method step 4. If in contrast the distance of the user from the viewed image object has decreased because the user approached the display device, it is checked in method step 6 whether the user is still looking at the originally viewed image object. If this is not the case, the display of the graphic user interface remains unchanged, and the method continues with method step 2. If the user is contrastingly still viewing the image object, it is concluded that the user desires more information, or respectively desires a more detailed display of this image object. The user can be provided with feedback on the image object that he is holding in focus, for example by a highlighted colored ID, or brighter representation, or however by an acoustic signal. If the approach exceeds a threshold, additional, or respectively more detailed information is output to the user in method step 7, such as assistance with operation or a more detailed visual representation. The output of additional information, or respectively switching to a display with more detailed information can be made dependent on the user confirming this by an additional input such as pressing a control button, gripping the steering wheel more tightly, or voice input.

Figure 2:
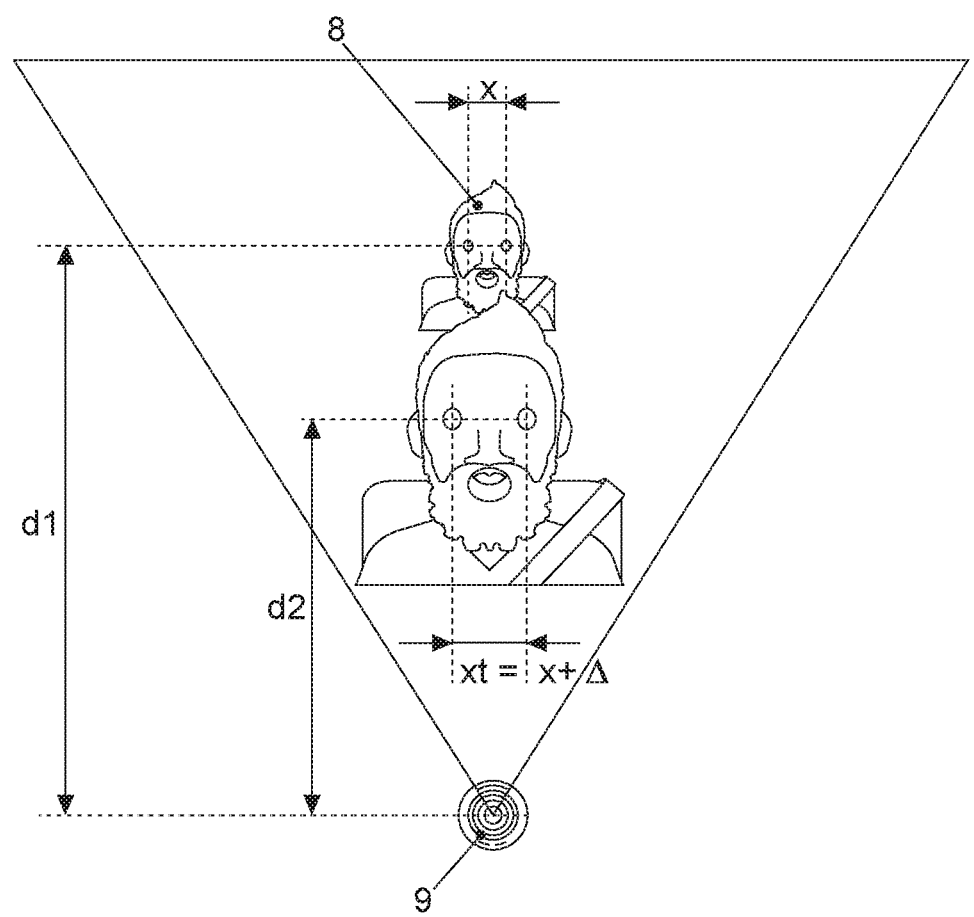
FIG. 2 schematically shows the determination by an eye tracking system of the approach to the display device.

FIG. 2 schematically shows the determination by an eye tracking system of the approach to the display device. Here, the user 8 is initially located in a starting position at a standard distance d1 of the eyes, or respectively the midpoint between the two eyes, from a display device (not shown). An eye tracking system 9 that is normally camera-based determines the two eyes of the user 8 using appropriate image analysis methods, and from this determines the interpupillary distance x of the user located at the standard distance d1. Moreover, the eye tracking system 9 detects the eye pupils in order to ascertain the viewing direction therefrom, and to determine an image object being viewed by the user. If the user 8 still wants to view this image object in greater detail and therefore approaches the display device, the eye tracking system 9 detects an increase in the interpupillary distance at $xt=x+\Delta$ and determines the reduced spacing d2 relative to the display device.

The eye tracking system 9 preferably has an NIR camera (near-infrared, NIR) that detects shortwave infrared radiation directly adjacent to the visible range. In this case, lighting can be from one or more NIR LEDs, in particular in the dark. When used in a motor vehicle, both the NIR camera as well as the NIR LEDs can be arranged at different locations in the vehicle interior, wherein an arrangement of the NIR camera close to the viewed display is possible in an embodiment. The NIR camera and the NIR LEDs can be installed separately or also in a common sensor component.

Figure 3:
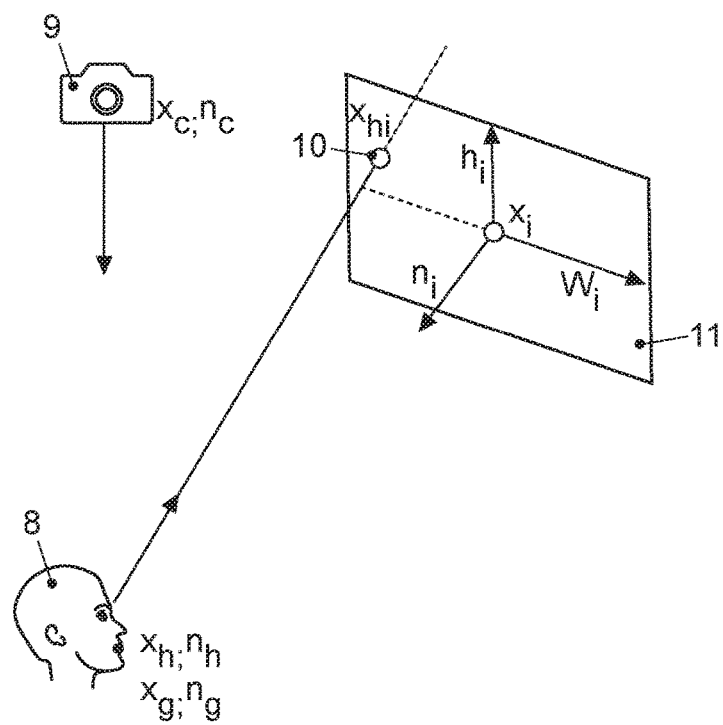
FIG. 3 schematically shows the determination of an image object held in focus with the assistance of the eye tracking system.

FIG. 3 schematically shows the determination of an image object held in focus with the assistance of the eye tracking system. For example, when used in a motor vehicle, a driver monitoring camera can detect the eye viewing direction and the position of the head and infer the object held in focus by the known geometry in the vehicle. A camera 9 of the driver monitoring system is located at position x, wherein the optical axis of the camera is aligned in direction $n_c$. The driver monitoring system determines the head position $x_h$ or the middle position $x_g$ between two eyes, as well as the head direction $n_h$ or eye viewing direction ng. One or more image objects are displayed on a display device (not shown), wherein several image objects or parts thereof can be distinguished according to the invention.

The image object 11 being viewed by the user is then recognized because the line of sight of the user resulting from the head direction $n_h$, or respectively eye viewing direction ng, intersects with this image object 11 at the intersection 10. Since moreover the position of the image objects characterized by index i is known in space, the spatial position $x_{hi}$ of the intersection 10 can be calculated. If the user reduces the spacing $\|x_h - x_{hi}\|$ while the viewing direction $n_h$ remains the same, an approach exists that leads to a detailed representation on the display device.

Figure 4:
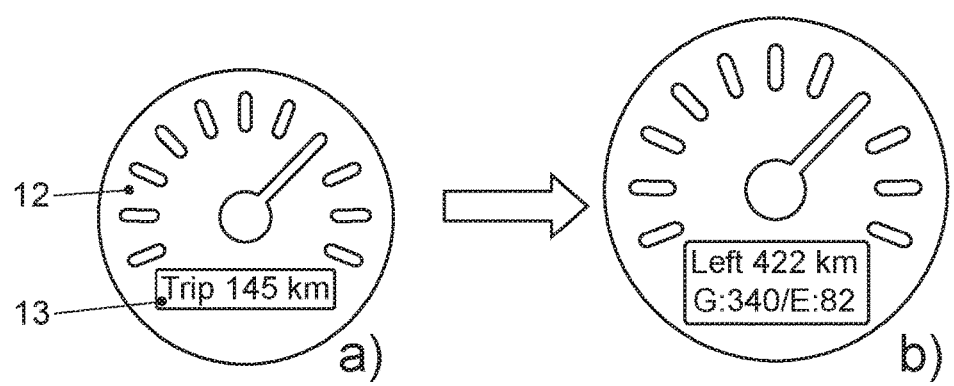
FIG. 4 shows how, using the example of a tachometer, a detailed representation occurs when the user approaches.

FIG. 4 shows how, using the example of a tachometer 12, a detailed representation occurs when a driver in a motor vehicle approaches. FIG. section 4a) shows the tachometer as is displayed at a standard distance of the driver from the instrument cluster. The tachometer display in this case recreates an analog display with a scale and tachometer needle. The kilometers driven by the vehicle are displayed on a daily kilometer counter below the tachometer needle in a display area 13. If the user approaches the depicted tachometer 12, the display changes as depicted in FIG. section 4b). In this case, instead of the driven kilometers, the remaining overall trip is displayed with a division of the possible distance using internal combustion and an electric drive.

Figure 5:
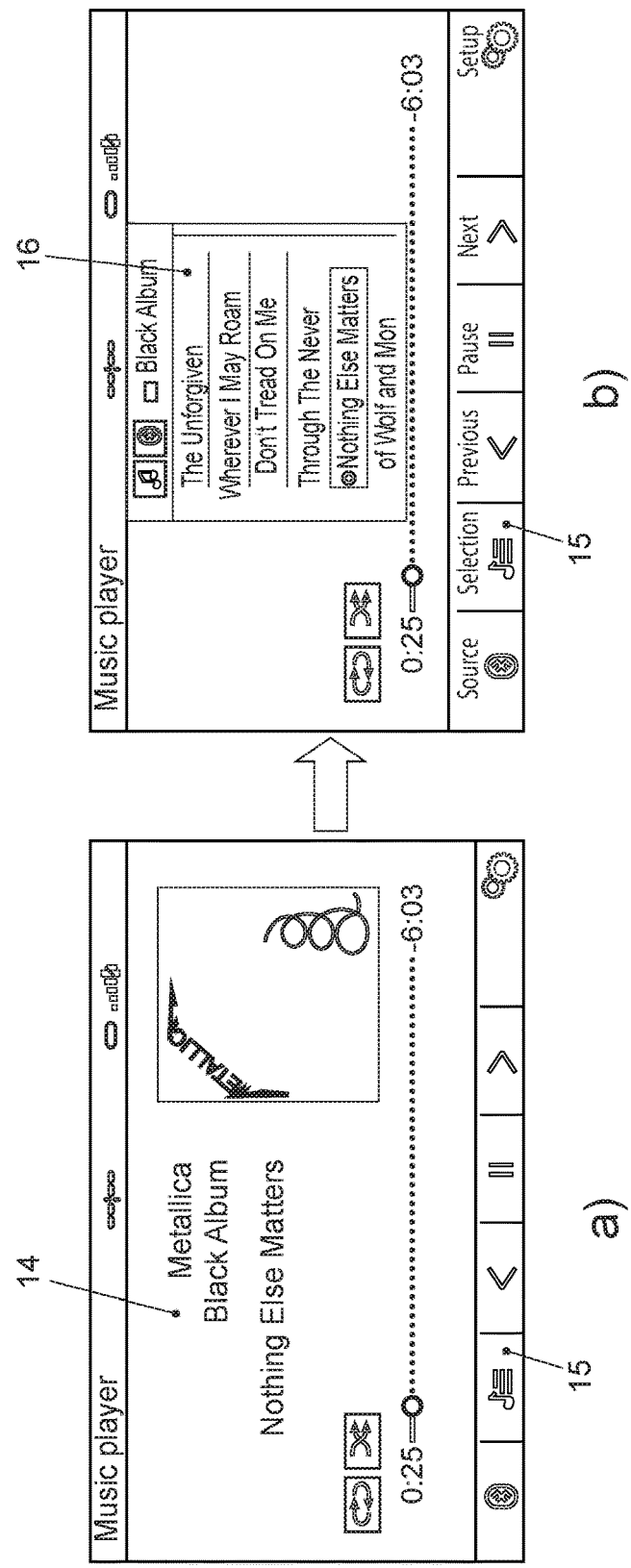
FIG. 5 shows, as another example, how a detailed representation occurs in a display for music playback by a media player when the user approaches.

Another example in the form of a display of music playback by a media player is shown in FIG. 5. FIG. section 5a) displays the title of the played back music album in a first display area 14 and the title being played. The cover of the played back music album can be represented in a second display area. Moreover, control elements 15 are depicted by graphic symbols at the bottom edge of the display. If the user approaches the music playback display, a more detailed display is shown as in FIG. section 5b). Instead of only showing the title currently being played, other titles of the music album are now displayed in a display area 16 before and after the currently played title. Likewise, it is contrastingly possible to display a currently played back playlist that comprises the currently played title and possibly select another title. The selection can be automatic if the user looks at the title to be selected for a predefined duration, or also by a touch when there is a touch screen. If only a part of the title list, or respectively playlist is displayed, it can also be provided to scroll up or down automatically in such a list when the user looks at the top or bottom edge of the depicted part of the list. Then a more detailed representation can also be provided for other display areas. For example, a short explanation of the function can be portrayed in text for the control elements 15 in addition to the graphic symbols.

In the example from FIG. 5, the display can be on any display of a wide range of technical equipment; when used in a motor vehicle, for example on a display arranged in the area of the middle console between the driver and passenger to the right of the steering wheel.

Figure 6:
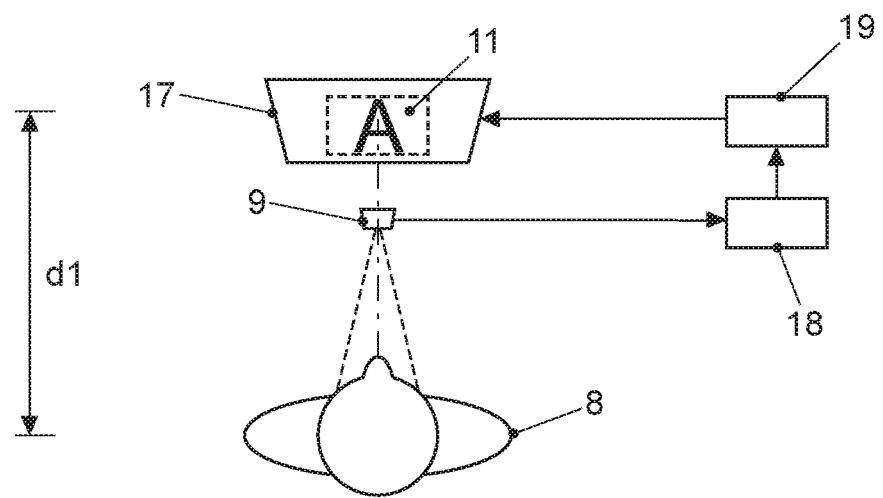
FIG. 6 schematically shows a block diagram of a device according to the invention with an adaptation of the display when the user approaches.
Figure 6:
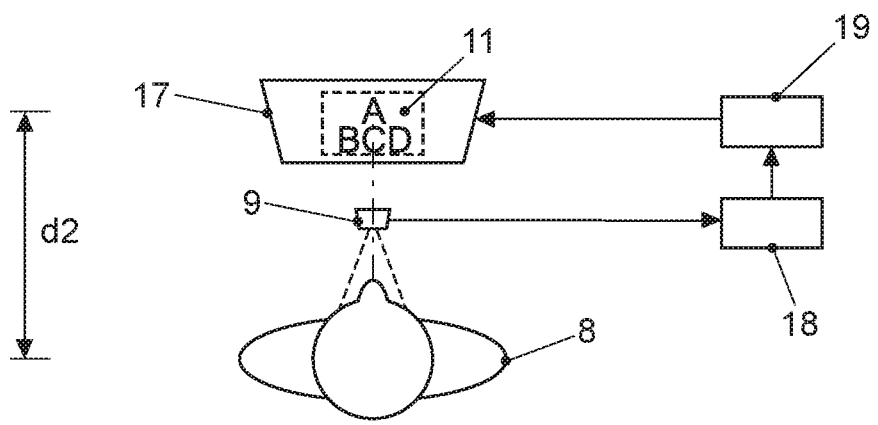

FIG. 6 schematically shows a block diagram of a device according to the invention with an adaptation of the display when a user approaches. The user 8 such as the driver in a motor vehicle is located in front of a display device 17 that is controlled by an image output unit which is part of the output unit 19 to display a graphical user interface. The head of the user is detected by a sensor of the eye tracking system 9 whose output signal is fed to an evaluation and control unit 18 in order to determine the position of the user's head, eyes and viewing direction and adapt the representation on the display device to the determined position.

In FIG. section 6a), the user 8 is at a standard distance from the display device 17. The head of the user is detected by the eye tracking system 9, and information about this is fed to the evaluation and control unit 18 which determines therefrom both the image object 11 viewed by the user as well as the distance d1 of the user from this image object in addition to the viewing direction and position. If the user approaches the display device as shown in FIG. section 6b), this is detected by the eye tracking system 9. The evaluation and control unit 18 determines the new distance d2 of the user from the image object 11. If the control unit 18 continues to verify that the user is focused on and continues to view the image object 11, the output unit 19 is controlled such that a more detailed visual representation of the viewed image object is on the display 17.

The viewing direction and position of the user's head can alternatively also be determined by sensors worn by the user. Accordingly, the eye tracking system can for example be integrated in data glasses such as so-called smart glasses in which digital images are projected on a transparent display arranged in front of the eye. For this, it is necessary to determine where the user is located relative to the display device.

In environments in which the user is spatially restricted, the effect of approaching can be amplified such that even smaller approaches are sufficient to cause a change in the presented information. For the driver of a motor vehicle, it can for example be determined by a sensor in the belt lock of the safety belt, possibly together with a sensor in the driver's seat, whether the driver is located on the seat and is buckled up; in this case, the threshold is reduced at which the additional, or respectively more detailed information is displayed.

The invention can be used in the field of automotive engineering, but is in nowise restricted thereto. Instead, the invention can be used in any computer-based systems in which a graphical user interface is depicted on a display.

REFERENCE NUMBER LIST

1 Method step with a display of the graphical user interface on a display device
2 Method step with detection of the viewing direction and viewing position
3 Method step with determination of the image object viewed by the user
4 Method step with determination of the distance of the user from the viewed image object
5 Method step with a check of whether the distance has decreased
6 Method step with a check of whether the image object is still being viewed
7 Method step with a display of additional information
8 User
9 Eye tracking system
10 Intersection of the line of sight with the image object
11 Image object
12 Tachometer
13 Display area for the daily kilometer counter, or respectively remaining overall trip
14 Display of the music title being played
15 Control elements depicted on the display
16 Display of part of a title list, or respectively playlist
17 Display device
18 Evaluation and control unit
19 Output unit Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method for interacting with a graphical user interface, wherein the method comprises the following steps:
    depicting a graphical user interface with a plurality of image objects on a display device;
    illuminating an area of a user's head position by an infrared light source;
    detecting, using an infrared detector, oriented towards the user's head position, a viewing direction and a position of a user of the graphical user interface depicted on the display device;
    determining an image object viewed by the user, from the plurality of image objects, from the detected viewing direction and position of the user;
    determining a distance of the user from the viewed image object from the position of the user and the position of the viewed image object on the display device;
    outputting additional information to the user when it is determined that the distance of the user from the viewed image object has been reduced and the image object was still viewed by the user.

2. The method according to claim 1, wherein an approach by the user is determined from an increase in the detected user's interpupillary distance.

3. The method according to claim 1, wherein the additional information is output when the approach by the user toward the viewed image object exceeds a threshold value.

4. The method according to claim 1, wherein feedback is provided to the user about which image object he has held in focus by continued observation.

5. The method according to claim 1, wherein the additional information is only output when the user confirms said information by an additional input.

6. The method according to claim 1, wherein the output additional information comprises a more detailed visual representation of the viewed image object.

7. The method according to claim 1, wherein the display device is arranged in a vehicle and can be viewed by a user in the vehicle.

8. A device for interacting with a graphical user interface having:
    a display device on which a graphical user interface with a plurality of image objects are displayed;
    an infrared light source, arranged to illuminate an area of the user's head position;
    an eye tracking system for detecting a viewing direction and a position of a user of the graphical user interface depicted on the display device; the eye tracking system comprising an infrared detector oriented towards the area of the user's head position;
    an evaluation and control unit that supplies an output signal of the eye tracking system, and that determines an image object from the plurality of image objects that is viewed by the user from the detected viewing direction and position of the user, and the distance of the user from the viewed image object; and
    an output unit that is controlled by the evaluation and control unit such that additional information is output depending on a determined approach of the user toward the viewed object.

9. The device according to claim 8, wherein the output unit comprises an image output unit that causes the graphical user interface to be displayed on the display device, and wherein when an approach by the user toward the display device is determined, there is a more detailed visual representation of the viewed image object.

10. The device according to claim 8, wherein said device is arranged in a vehicle and can be viewed by a user in the vehicle.

11. A motor vehicle that has a device for interacting with a graphical user interface, said device comprising:
- a display device on which a graphical user interface with a plurality of image objects is displayed;
- an infrared light source, arranged to illuminate an area of the user's head position;
- an eye tracking system for detecting a viewing direction and a position of a user of the graphical user interface depicted on the display device; the eye tracking system comprising an infrared camera oriented towards the area of the user's head position;
- an evaluation and control unit that supplies an output signal of the eye tracking system, and that determines an image object of the plurality of image objects that is viewed by the user from the detected viewing direction and position of the user, and the distance of the user from the viewed image object; and
- an output unit that is controlled by the evaluation and control unit such that additional information is output depending on a determined approach of the user toward the viewed object.

12. A motor vehicle that is configured to perform a method for interacting with a graphical user interface, wherein the method comprises the following steps:
- depicting a graphical user interface with a plurality of image objects on a display device;
- illuminating an area of the user's head position by an infrared light source and detected with an infrared camera oriented towards this area;
- detecting, using an infrared camera, a viewing direction and a position of a user of the graphical user interface depicted on the display device;
- determining an image object from the plurality of image objects that is viewed by the user from the detected viewing direction and position of the user;
- determining a distance of the user from the viewed image object from the position of the user and the position of the viewed image object on the display device;
- outputting additional information to the user when it is determined that the distance of the user from the viewed image object has been reduced and the image object was still viewed by the user.

\* \* \* \* \*